(12) United States Patent
Romig

(10) Patent No.: US 12,025,351 B2
(45) Date of Patent: Jul. 2, 2024

(54) GEOTHERMAL COOLING OF A COOLANT USED IN A HEAT EXCHANGE EQUIPMENT

(71) Applicant: Chevron Phillips Chemical Company LP, The Woodlands, TX (US)

(72) Inventor: Ralph W. Romig, Kingwood, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

(21) Appl. No.: 17/806,036

(22) Filed: Jun. 8, 2022

(65) Prior Publication Data
US 2023/0400226 A1    Dec. 14, 2023

(51) Int. Cl.
F24T 10/10    (2018.01)
F24T 50/00    (2018.01)
F28D 21/00    (2006.01)

(52) U.S. Cl.
CPC .............. *F24T 50/00* (2018.05); *F24T 10/10* (2018.05); *F28D 21/00* (2013.01); *F28D 2021/0022* (2013.01); *F28D 2021/0028* (2013.01)

(58) Field of Classification Search
CPC .................................. F24T 50/00; F24T 10/10
See application file for complete search history.

(56) References Cited

U.S. PATENT DOCUMENTS

| | | |
|---|---|---|
| 3,152,872 A | 10/1964 | Scoggin |
| 4,737,280 A | 1/1988 | Hanson |
| 5,004,374 A * | 4/1991 | Grey .......................... F28D 7/08 165/172 |
| 6,235,852 B1 | 5/2001 | Hess |
| 8,273,299 B2 * | 9/2012 | Parisel ................. B01J 19/2435 422/138 |
| 8,833,098 B2 * | 9/2014 | Wiggs ..................... F25B 30/06 165/45 |
| 10,394,290 B2 | 8/2019 | Hardin |
| 10,752,821 B2 | 8/2020 | Shaaban |
| 10,894,840 B2 * | 1/2021 | Odi ......................... F28F 27/02 |
| 2004/0192860 A1 | 9/2004 | Hottovy |
| 2005/0265919 A1 | 12/2005 | Lomax, Jr. |
| 2013/0213868 A1 | 8/2013 | Tempest, Jr. |
| 2017/0293330 A1 * | 10/2017 | Hardin ....................... F03G 7/04 |
| 2020/0011151 A1 * | 1/2020 | Toews .................. C09K 8/5045 |
| 2020/0103128 A1 * | 4/2020 | Konyari .................... E04B 1/74 |
| 2021/0095896 A1 * | 4/2021 | Andrews ................. F24T 10/10 |
| 2022/0073714 A1 * | 3/2022 | Guzman-Carrazco .... C08F 2/18 |

OTHER PUBLICATIONS

International Search Report and Written Opinion issued in corresponding PCT Application No. PCTUS2023/067731, mailed on Sep. 20, 2023, 11 pp.

* cited by examiner

*Primary Examiner* — Devon Russell
(74) *Attorney, Agent, or Firm* — Scheef & Stone, LLP

(57) ABSTRACT

Disclosed is a process and apparatus for cooling a coolant used in a heat exchange equipment in a plant. The process is performed in a plant having the apparatus disclosed herein. The process and apparatus utilize a geothermal cooling loop for cooling at least a portion of the total amount of coolant circulating in the coolant loop that is used to cool a surface of a heat exchange equipment in the plant.

18 Claims, 7 Drawing Sheets

GEOTHERMAL COOLING OF A COOLANT USED IN A HEAT EXCHANGE EQUIPMENT

FIELD

The present disclosure generally relates to cooling a warmed coolant received from heat exchange equipment in a plant.

BACKGROUND

Petrochemical processes can involve cooling of reactors and process streams. For example, polymerization reactions are generally exothermic, and a coolant can be used to remove heat from a surface of the polymerization reactor to control the polymerization temperature inside the reactor. The coolant can flow through jackets on the surface of the polymerization reactor to remove heat from the reactor, and the warmed coolant can flow from the jackets and then be cooled for circuitous use for continuous cooling of the reactor. For cooling a process stream in a plant, a heat exchanger can be used to remove heat from the process stream, with a coolant.

Warmed coolant that is produced when the coolant absorbs heat from the surface of the heat exchange equipment (e.g., a surface of an exothermic polymerization reactor) can utilize a coolant heat exchanger to reduce the temperature of the warmed coolant for circulation back to the heat exchange equipment. The coolant heat exchanger can be a shell and tube heat exchanger or a plate and frame heat exchanger, for example. A utility cooling medium, such as cooling tower water or sea water, can flow through the coolant heat exchanger, removing heat from the coolant via a heat transfer surface area of the coolant heat exchanger. The utility cooling medium can be supplied by a tower water system, and the size of the tower water system (the volume of water needed in the system) depends on the cooling duty of the heat exchange equipment. The coolant heat exchanger can be responsible for the cooling duty of the heat exchange equipment, in that, the coolant heat exchanger can cool the coolant that is warmed by contact of the coolant with the surface of the heat exchange equipment. The amount of heat that is absorbed by the coolant and transferred to the utility cooling medium can create water vapor emissions (water lost to evaporation) in the tower water system, in addition to drift that occurs in such a cooling system. For a tower water system that provides utility cooling medium to heat exchangers for process stream cooling, the heat exchangers can be subject to leakage of hydrocarbons into the utility cooling medium, due to, for example, a pressure differential between a higher pressure process stream on one side of the heat exchanger and the lower pressure utility cooling medium on another side of the heat exchanger.

There is a need to reduce the amount of utility cooling medium that evaporates from the tower water system and to reduce hydrocarbon emissions from process stream heat exchangers.

SUMMARY

A process for cooling a coolant used in a heat exchange equipment in a plant, the process comprising: introducing a first warmed coolant having a first temperature to an inlet of a cooling system comprising a geothermal cooling loop; and cooling the first warmed coolant in the cooling system to form a cooled coolant having a second temperature, wherein the second temperature is less than the first temperature, wherein an inlet of the cooling system is fluidly coupled to a coolant outlet of the heat exchange equipment in the plant, wherein an outlet of the cooling system is fluidly coupled to a coolant inlet of the heat exchange equipment in the plant.

A cooling apparatus for coolant used to cool a heat exchange equipment in a plant, comprising: a geothermal cooling loop comprising an underground conduit that is buried within a boundary of the plant at a depth under a surface of the earth such that an ambient temperature at the depth is always in a range of from about 40° F. (4° C.) to about 80° F. (27° C.). The geothermal cooling loop is configured to receive a warmed coolant or an intermediate coolant to form a cooled coolant having temperature in a range of from about 60° F. (15.5° C.) to about 100° F. (37.8° C.). An inlet of the geothermal cooling loop is fluidly coupled to a coolant outlet of the heat exchange equipment in the plant, wherein an outlet of the geothermal cooling loop is fluidly coupled to a coolant inlet of the heat exchange equipment in the plant.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
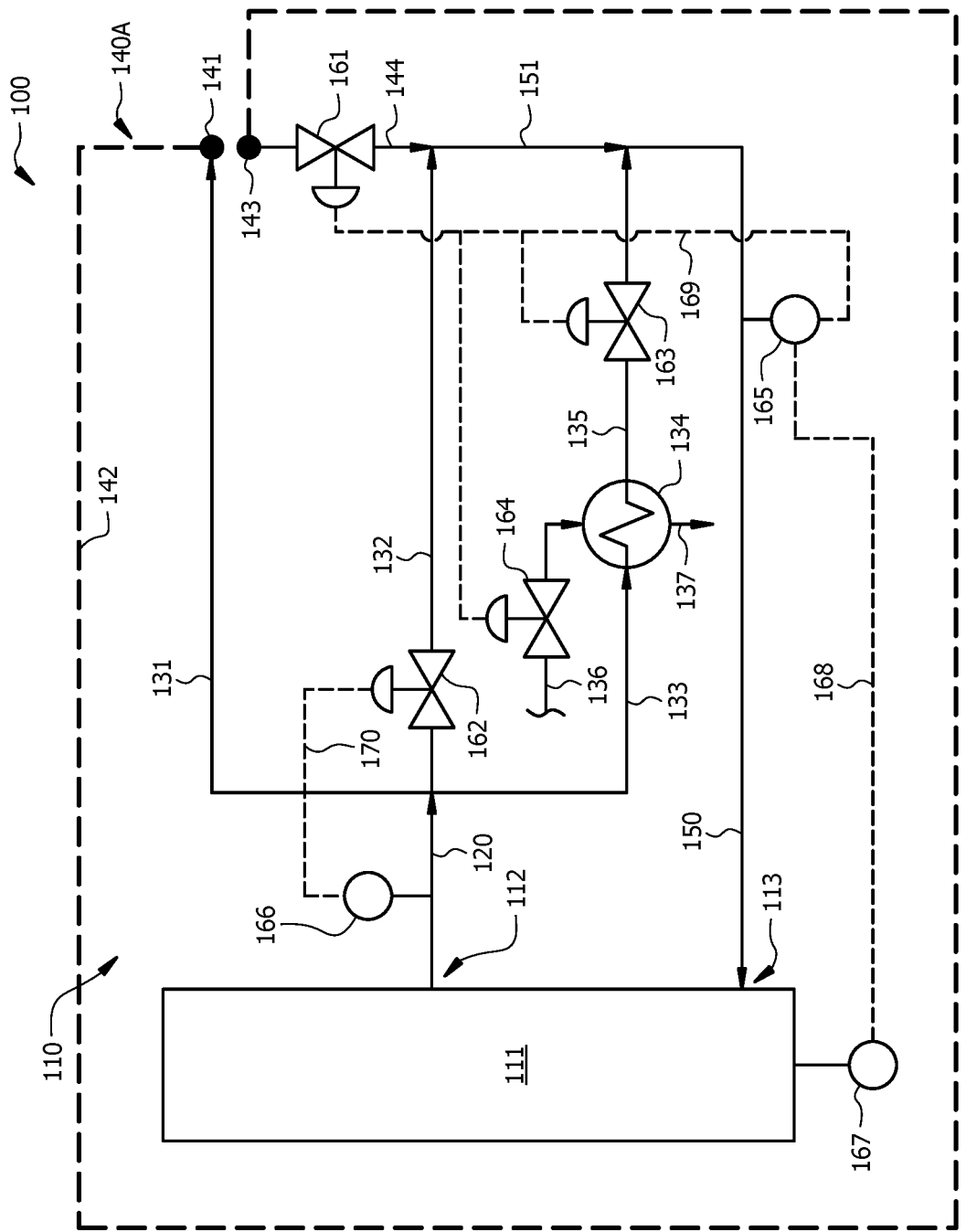
FIG. 1 is a schematic plan view of a plant having an apparatus for cooling a coolant used in a heat exchange equipment.

Illustrative aspects of the subject matter claimed herein will now be disclosed. In the interest of clarity, not all features of an actual implementation are described in this specification. It can be appreciated that in the development of any such actual aspect, numerous implementation-specific decisions must be made to achieve the developers' specific goals, such as compliance with system-related and business-related constraints, which can vary from one implementation to another. Moreover, it can be appreciated that such a development effort, even if complex and time-consuming, would be a routine undertaking for those of ordinary skill in the art having the benefit of this disclosure.

The term "stream" as used herein refers to a composition of the components disclosed herein for the respective stream. The term "stream" can additionally refer to and imply associated equipment, such as conduit, line, and pipe that is used to move the composition from one location to another (e.g., a stream from one equipment unit to another equipment unit).

The term "conduit" as used herein refers to a tubular structure through which a fluid can flow and having a wall thickness rated for the fluid pressure. A conduit can be embodied as a pipe or tube, for example. Additionally, conduit may refer to a segment of pipe or tubes, or to a series or string of pipes or tubes.

The term "coolant" as used herein refers to a liquid state fluid that can be used for heat exchange purposes, e.g., to cool a surface of an equipment. The surface of the equipment that can be coolant can be the outer surface of a reactor equipment or a heat exchange surface in a heat exchanger. A suitable coolant used herein includes water obtained, for example, from a process in the plant, as condensate of steam, or from another water supply.

Disclosed herein is a process for cooling a coolant used in a heat exchange equipment in a plant. The process can be performed in a plant having an embodiment of the cooling apparatus disclosed herein. The process and apparatus utilize a geothermal cooling loop for cooling at least a portion of the total amount of coolant circulating in the coolant loop that is used to cool a surface of a heat exchange equipment in the plant. The perimeter of the plant can be used for placement of the geothermal cooling loop, and the arrangements disclosed herein allow for conduit lengths adequate for proper cooling. The disclosed process and apparatus can be used to cool coolant for the heat exchange equipment without the use of a utility cooling medium supplied from a cooling water tower. Evaporation of utility cooling medium and leaking of hydrocarbons into the utility cooling medium is reduced because the utility cooling medium is not needed to cool the coolant. Instead, the geothermal cooling loop uses the earth as a heat sink to cool the warmed coolant supplied from the heat exchange equipment of the plant. In some aspects, the geothermal cooling loop can be used in combination with a mechanical cooling apparatus such as an air fin cooler.

In the case of a large scale polyethylene production plant, about half of the amount of utility cooling medium in the tower water system is used to cool the loop slurry reactor. It is believed that using the disclosed process and apparatus instead of the tower water system for cooling the reactor coolant can reduce the amount of utility cooling medium needed in the plant by as much as 50%. Reducing the amount of utility cooling medium needed in the plant reduces the capital cost of the tower water system (including size and number of pumps and water tanks for the tower water system), which reduces power consumption and maintenance costs of the tower water system. Reducing the amount of utility cooling medium needed in the plant also reduces the likelihood and occurrence of problems associated with using the utility cooling medium, including tower water system fouling, utility cooling medium evaporation from the tower water system, and hydrocarbon emissions.

Further, tower water system cooling efficiency changes with air temperature and humidity; thus, utility cooling medium cooling with a tower water system is dependent upon changes in air temperature and humidity due to weather events and seasonal conditions. Because the disclosed process and apparatus can be used to cool coolant for the heat exchange equipment without the use of a utility cooling medium, the cooling efficiency is less dependent on the air temperature and humidity since the temperature of the geothermal cooling can remain within a smaller temperature range (e.g., annual change of less than 10° F. (5.6° C.)) that is independent of atmospheric air temperature and humidity.

Figure 2:
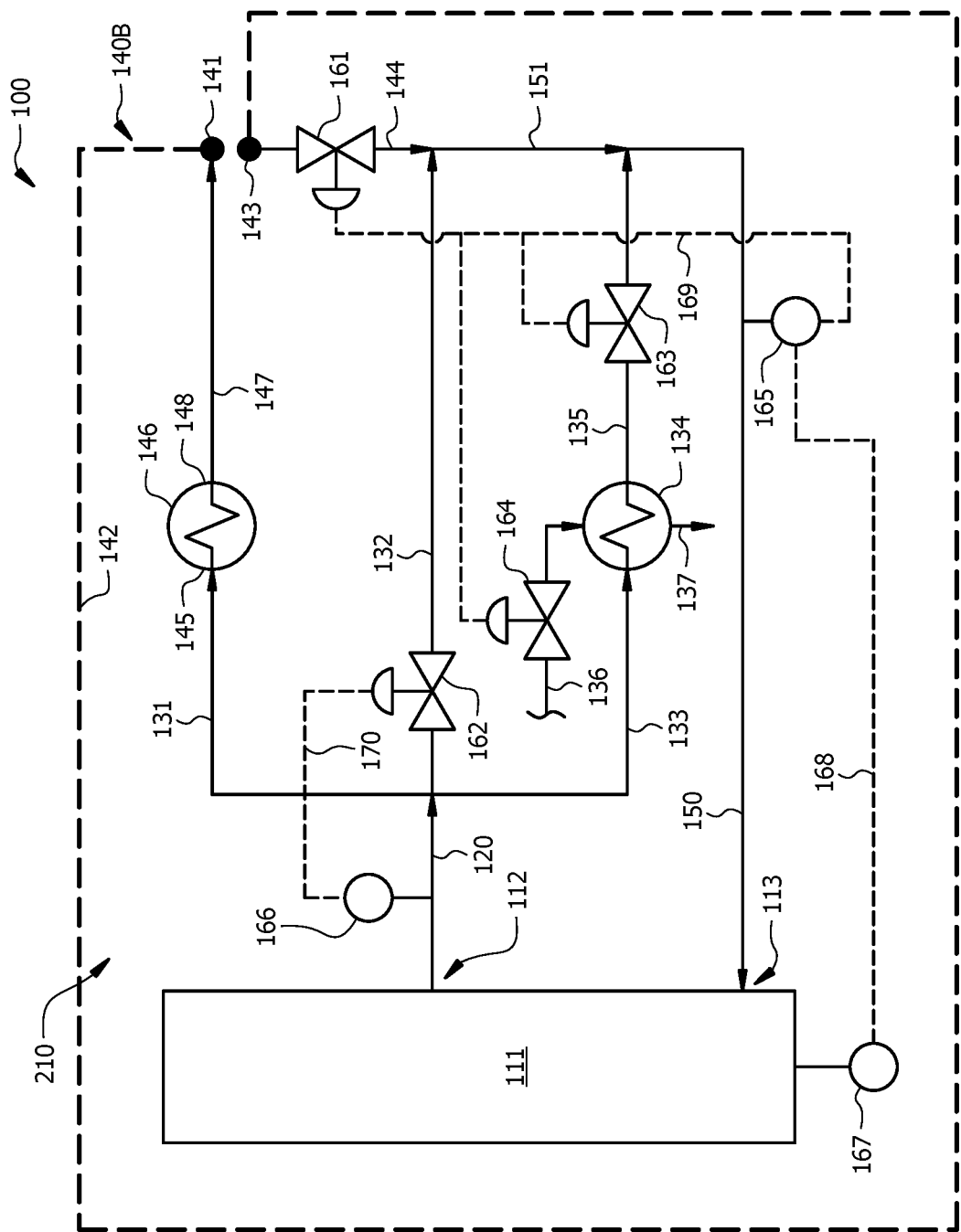
FIG. 2 is a schematic plan view of the plant utilizing another apparatus for cooling a coolant used in a heat exchange equipment.

FIG. 1 is a schematic plan view of a plant 100 having an apparatus 110 for cooling a coolant used in a heat exchange equipment 111. FIG. 2 is a schematic plan view of the plant 100 utilizing another apparatus 210 for cooling a coolant used in a heat exchange equipment 111. The following description applies for the plant 100 in FIG. 1 and FIG. 2, except where differences are discussed.

The plant 100 can be a refining or petrochemical plant, for example, configured to convert a hydrocarbon feedstock into a product through chemical and engineering techniques such as reactions, separations, heating, cooling, or combinations thereof. The plant 100 can include processing equipment such as reactors (e.g., one or more polymerization reactors), heat exchangers (e.g., shell and tube, plate and frame), separators (e.g., flash tank, purge vessel, vapor liquid separator, distillation column, pressure swing absorption apparatus, stripping column, absorption column, or combinations thereof), valves, pumps, compressors, blowers, control equipment (e.g., logic controllers, communication networking), sensors (e.g., transducers, thermocouples, gas analyzers), safety equipment, and combinations thereof.

The plant 100 can include heat exchange equipment 111 that utilizes a coolant to remove heat from a reactor or from a process stream. Non-limiting examples of heat exchange equipment 111 can include cooling jackets on a polymerization reactor, one or more heat exchangers in an isobutane and nitrogen recovery unit (INRU), a condenser for a heavy distillation column in a monomer/diluent recovery train, or combinations thereof. The plant 100 can include other equipment and processes that are not illustrated for clarity of disclosure.

The heat exchange equipment 111 can provide a warmed coolant in stream 120 via an outlet 112 of the heat exchange equipment 111. Stream 120 is fluidly connected (e.g., by a pipe connector such as a tee connector) to the apparatus 110 in FIG. 1 and to apparatus 210 in FIG. 2. The apparatus 110 and 210 are configured to split the warmed coolant received from stream 120 into three portions: first warmed coolant in stream 131, second warmed coolant in stream 132, and third warmed coolant in stream 133. The flow of warmed coolant in stream 131 is parallel to the flow of warmed coolant in stream 132 and to the flow of warmed coolant in stream 133; and the flow of warmed coolant in stream 132 is parallel to the flow of warmed coolant in stream 133.

In the apparatus 110 of FIG. 1, stream 131 is fluidly connected to an inlet 141 of a cooling system 140A. The cooling system 140A of apparatus 110 includes a geothermal cooling loop 142 that includes a series of conduits connected end-to-end. The illustration of the geothermal cooling loop 142 in a dashed line indicates that the conduits are below the surface of the earth (e.g., buried underground). An outlet 143 of the geothermal cooling loop 142 is the outlet 143 of the cooling system 140A. With regard to the apparatus 110 in FIG. 1, the inlet 141 of the cooling system 140A is also the inlet for the geothermal cooling loop 142, and the outlet 143 of the cooling system 140A is also the outlet for the geothermal cooling loop 142. The inlet 141 and outlet 143 of the geothermal cooling loop 142 can be at or above the surface of the pad site at the plant 100. In aspects, the geothermal cooling loop 142 in cooling system 140A can have a heat transfer coefficient of about 1 to about 2 Btu/° F.-ft$^2$.

In the apparatus 210 of FIG. 2, stream 131 is fluidly connected to an inlet 145 of a cooling system 140B. The cooling system 140B of apparatus 210 includes a mechanical cooling apparatus 146 fluidly connected to the inlet 141 of the geothermal cooling loop 142. The mechanical cooling apparatus 146 can be any heat exchanger that does not utility a cooling fluid to remove heat from the warmed coolant that passes through the mechanical cooling apparatus 160 in the cooling system 140B of apparatus 210. In aspects, the mechanical cooling apparatus 146 is an air fin heat exchanger; in alternative aspects, the mechanical cooling apparatus 146 can be embodied as two or more air fin heat exchangers placed in series, in parallel, or both in series and in parallel. The warmed coolant from stream 131 can flow into the inlet 145 of the air fin heat exchanger(s), where heat is transferred from the warmed coolant to a contact surface in the air fin heat exchanger. The fins of the air fin heat exchanger can transfer the heat to the air in the atmosphere. In aspects, fans can be used to blow air across the fins of the air fin heat exchanger. In aspects, the mechanical cooling apparatus 146 (e.g., embodied as one or more air fin coolers) in cooling system 140B can have a heat transfer coefficient of about 12 Btu/° F.-ft$^2$, and the geothermal cooling loop 142 in cooling system 140B can have a heat transfer coefficient of about 1 to about 2 Btu/° F.-ft$^2$.

In the apparatus 210 of FIG. 2, the mechanical cooling apparatus 146 is shown as being fluidly connected to the geothermal cooling loop 142 upstream of the geothermal cooling loop 142. The mechanical cooling apparatus 146 has an inlet 145 fluidly connected to stream 131, and an outlet 148 fluidly connected to stream 147. Stream 147 is fluidly connected to the inlet 141 of the geothermal cooling loop 142. An outlet 143 of the geothermal cooling loop 142 is the outlet 143 of the cooling system 140B. The inlet 141 and outlet 143 of the geothermal cooling loop 142 can be at or above the surface of the pad site at the plant 100. Including the mechanical cooling apparatus 146 upstream of the geothermal cooling loop 142 may provide coolant cooling that 1) does not utilize a tower water system, and 2) can reduce the length of the geothermal cooling loop 142 in the apparatus 210 of FIG. 2 compared to the length of the geothermal cooling loop 142 in the apparatus 110 of FIG. 1, when cooling warmed coolant to the same outlet temperature in stream 144. The illustration of the geothermal cooling loop 142 in a dashed line in FIG. 2, like FIG. 1, again indicates that the conduits are below the surface of the earth (e.g., buried underground). With regard to the apparatus 210 in FIG. 2, the inlet 145 of the cooling system 140B is the inlet for the mechanical cooling apparatus 146, and the outlet 143 of the cooling system 140A is the outlet for the geothermal cooling loop 142.

In both apparatuses 110 and 210, the geothermal cooling loop 142 extends around the plant 100. Aspects of the disclosure contemplate that the geothermal cooling loop 142 has a length that is suitable for cooling warmed coolant to a temperature of the earth at the depth of the buried underground conduits (e.g., a temperature of the earth at the depth being a temperature in a range of about 40° F. (4° C.) to about 80° F. (27° C.); alternatively, a temperature in a range of about 45° F. (7.2° C.) to about 75° F. (23.9° C.); alternatively, a temperature in a range of about 50° F. (10° C.) to about 70° F. (21.1° C.); alternatively, a temperature in a range of about 50° F. (10° C.) to about 60° F. (15.6° C.), in combination with a depth in a range of about 8 ft (2.4 m) to about 40 ft (12.2 m); alternatively, a depth in a range of about 10 ft (3 m) to about 40 ft (12.2 m); alternatively, a depth in a range of about 10 ft (3 m) to about 30 ft (9.2 m); alternatively, a depth in a range of about 20 ft (6.0 m) to about 30 ft (9.2 m).

In FIG. 1 and FIG. 2, the geothermal cooling loop 142 is illustrated as having a length commensurate with one revolution around the perimeter of the plant 100; however, it is contemplated that the geothermal cooling loop 142 can make two or more revolutions around the perimeter of the plant 100. In some aspects, the number of revolutions around the plant 100 can also include fractional revolutions, e.g., 1.25, 1.5, 1.75, 2.25, 2.5, 2.75, or more revolutions. In aspects, the perimeter can be within a boundary of the plant 100.

In both apparatuses 110 and 210, the outlet 143 of the cooling system 140A and 140B is fluidly connected to stream 144.

Stream 132 is a bypass line through which a portion of the warmed coolant flows without being cooled (e.g., via cooling system 140A) and without being heated (e.g., via heater 134). The coolant in stream 132 may be heated or cooled by ambient conditions at the plant 100; however, there is no equipment in stream 132 to heat or cool the coolant in stream 132 beyond any effect of heating or cooling provided by ambient conditions.

Stream 133 is connected to a heater 134. The heater 134 is configured to heat the warmed coolant received from stream 133 to produce heated coolant in stream 135. The heater 134 can be embodied as any equipment that can heat the coolant of stream 133, such as a shell and tube heat exchanger, a mixer, a sparger, or an eductor. In aspects, the heater 134 can be embodied as a shell and tube heat exchanger, and heating medium (e.g., steam) can be supplied to the heater 134 via stream 136. The heating medium can be either on the shell side or the tube side of the heater 134, and the heater 134 may not be configured to mix the heating medium with the coolant. For example, heat can be transferred from the steam, causing the water vapor to condense and be removed from the heater 134 in stream 137 as steam condensate. The condensate may be recovered or sent to drain (sewer). In aspects, the heater 134 can be embodied as an eductor, such as a pick heater, and steam used as the heating medium can be supplied to the eductor via stream 136. The supplied steam can mix with the coolant received from stream 133 in the eductor to heat the coolant via direct steam injection. In such aspects, stream 137 may not be used. In one configuration, a four inch steam sparger can add 300 psig steam directly into the coolant through an 18 inch piping elbow.

Stream 132 and stream 144 are configured to combine to form stream 151. Stream 135 and stream 151 are configured to combine to form combined coolant stream 150. The combined coolant stream 150 is fluidly connected to an inlet 113 of the heat exchange equipment 111. While stream 132 is illustrated in FIGS. 1 and 2 as being between stream 131 and 133, the disclosure contemplates that the apparatus 110 and apparatus 210 can split stream 120 into streams 131, 132, and 133 in any configuration. Alternative aspects contemplate that stream 132 and stream 135 can combine to form stream 151, and stream 151 combines with stream 144 to form stream 150. Alternatively, stream 144, stream 132, and stream 135 can all combine to form stream 150, and in such aspects, the apparatus 110 and apparatus 210 does not include stream 151.

The flow of coolant in both apparatuses 110 and 210 can be controlled by coolant flow controller 165 and coolant flow controller 166. Coolant flow controller 165 can receive a set point signal 168 from a heat exchange equipment controller 167 that is connected to the heat exchange equipment 111. For example, the heat exchange equipment controller 167 can include a reactor controller configured to control the temperature of polymerization reactor, in aspects where the heat exchange equipment 111 includes cooling jackets for the polymerization reactor. Alternatively or additionally, the heat exchange equipment controller 167 can include a process stream temperature controller for a heat exchanger output in an INRU, in aspects where the heat exchange equipment 111 includes a heat exchanger of an INRU. Alternatively or additionally, the heat exchange equipment controller 167 can include a process stream temperature controller for a condenser in a distillation column. The temperature set point of controller 167 can be entered by a human operator, for example.

The coolant flow controller 165 is configured to actuate control valves 161, 163, and 164. Coolant flow controller 165 can be electrically or pneumatically connected (indicated by dashed lines) to control valve 161 in stream 144 to control the flow rate of cooled coolant flowing from the cooling system 140A, control valve 163 to control the flow rate of heated coolant flowing from heater 134, and control valve 164 to control the flow rate of heating fluid (e.g., steam) in stream 136 that provides heat in the heater 134. Coolant flow controller 165 can be configured to sense or detect, via a sensor coupled with the flow of combined coolant in stream 150, a condition of the combined coolant in stream 150, such as temperature, pressure, or flow rate of the coolant.

The coolant flow controller 165 can control the temperature of the return coolant temperature in stream 150 at a setpoint coolant temperature. The coolant flow controller 165 can detect or sense the condition in the coolant of stream 150, compare the detected condition with the coolant temperature set point (e.g., provided by the signal 168 from the reactor controller 167), send one or more output signal 169 to adjust the valve opening positions of one or more of valves 161, 163, and 164 (e.g., the adjustment for each valve being based on a difference between the detected coolant temperature and the coolant temperature set point).

The coolant flow controller 166 is configured to actuate control valve 162 that is in the coolant bypass line (in stream 132). Coolant flow controller 166 can be electrically or pneumatically connected (indicated in dashed lines) to control valve 162 in stream 132 to control the flow rate of warmed coolant in the bypass line that is stream 132. Coolant flow controller 166 can be configured to sense or detect, via a sensor coupled with the flow of warmed coolant in stream 120, a condition of the combined coolant in stream 150 (also referred to as return coolant stream), such as temperature, pressure, or flow rate of the warmed coolant.

The coolant flow controller 166 can control the flow rate of warmed coolant in stream 132. The coolant flow controller 166 can detect or sense the condition in the coolant of stream 132, compare the detected condition with the coolant condition set point, send one or more output signal 170 to adjust the valve opening positions of valve 162 (e.g., the adjustment being based on a difference between the detected coolant condition and the set point).

Figure 3A:
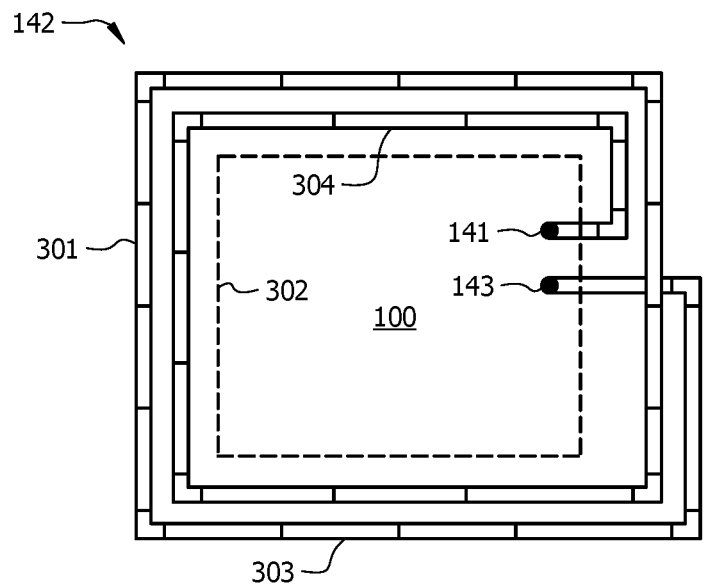
FIG. 3A illustrates a schematic plan view of an arrangement of conduits in the geothermal cooling loop.
Figure 3B:
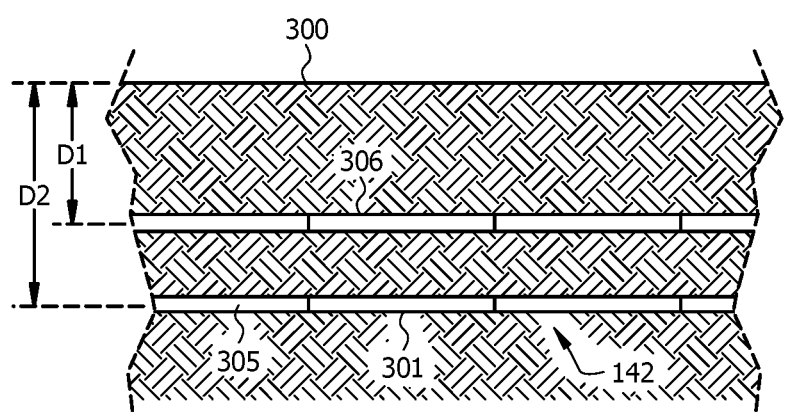
FIG. 3B illustrates a sectional side view of another arrangement of conduits in the geothermal cooling loop.

FIG. 3A illustrates a schematic plan view of an arrangement of conduits 301 in the geothermal cooling loop 142, and FIG. 3B illustrates a sectional side view of another arrangement of conduits 301 in the geothermal cooling loop 142 buried under a surface 300 of the earth. FIG. 3A and FIG. 3B are included to illustrate two arrangements of conduits 301 in the geothermal cooling loop 142. The geothermal cooling loop 142 in both FIG. 3A and FIG. 3B is made of a series of conduits 301 (e.g., pipe or tube segments) connected end-to end.

In FIG. 3A, the conduits 301 form a spiral flow path around the plant 100 when viewing the plant 100 in plan view. The conduits 301 can be placed in an outward spiral configuration such that an outer section 303 of the conduits 301 in the spiral are a greater distance from the perimeter 302 of the plant 100 than an inner section 304 of the conduits 301 in the spiral.

FIG. 3B shows one section 305 of the conduits 301 can be buried below another section 306 of the conduits 301. Aspects of the disclosure contemplated that the conduits 301 can have a combination of the configuration in FIG. 3A and the configuration in FIG. 3B (e.g., the spiral arrangement has vertical separation of conduits and not lateral separation of conduits, or the spiral arrangement has both vertical and horizontal separation of conduits).

The conduits 301 in FIG. 3A and FIG. 3B can be buried at a depth that is in a range of depth D1 to depth D2. Depth D1 can be in a range of about 8 ft (2.4 m) to about 30 ft (9.2 m) below the surface 300 of the earth; alternatively, in a range of about 8 ft (2.4 m) to about 30 ft (9.2 m) below the surface 300 of the earth; alternatively, in a range of about 8 ft (2.4 m) to about 20 ft (6.0 m) below the surface 300 of the earth; alternatively, in a range of about 8 ft (2.4 m) to about 12 ft (3.6 m) below the surface 300 of the earth. Depth D2 can be in a range of about 12 ft (3.6 m) to about 40 ft (12.2 m) below the surface 300 of the earth; alternatively, in a range of about 20 ft (6.0 m) to about 40 ft (12.2 m) below the surface 300 of the earth; alternatively, in a range of about 20 ft (6.0 m) to about 30 ft (9.2 m) below the surface 300 of the earth; alternatively, in a range of about 12 ft (3.6 m) to about 30 ft (9.2 m) below the surface 300 of the earth; alternatively, in a range of about 12 ft (3.6 m) to about 20 ft (6.0 m) below the surface 300 of the earth. At a depth in a range of 10 ft to 40 ft (3.0 m to 12.2 m), the temperature of the earth is relatively constant year-round, ranging from about 40° F. (10° C.) to about 80° F. (15.6° C.). At a depth in a range of 20 ft to 30 ft (6.0 m to 9.2 m), the temperature of the earth is relatively constant year-round, ranging from about 50° F. (10° C.) to about 60° F. (15.6° C.).

In aspects, a pipe size of the conduits 301 can be in a range of from 1.25 inches to 6 inches nominal pipe size (diameter nominal (DN) of 32 mm to 150 mm); alternatively, in a range of from 1.25 inches to 4 inches (DN of 32 mm to 100 mm); alternatively, in a range of from 1.5 inches to 3 inches (DN of 40 mm to 80 mm); alternatively, 1.5 inches (DN of 40 mm); alternatively, 2 inches (DN of 50 mm); alternatively, 3 inches (DN of 80 mm); alternatively, 4 inches (DN of 100 mm); alternatively, 5 inches (DN of 125 mm); alternatively, 6 inches (DN of 150 mm). In aspects, a length of each conduit 301 can be in a range of from about 1 ft (0.3048 m) to about 20 ft (6.096 m).

In aspects where a nominal pipe size of the conduits 301 is 2 inches (DN of 50 mm), a length of the conduits of the geothermal cooling loop 142 can range from about 11 km to about 30 km. More particularly, conduits in the geothermal cooling loop 142 in apparatus 110 of FIG. 1 can have a total length in a range of from about 15 km to about 30 km. Conduits in the geothermal cooling loop 142 in apparatus 210 of FIG. 2 can have a total length in a range of from about 11 km to about 13 km. The shorter length of geothermal cooling loop 142 in the apparatus 210 of FIG. 2 compared with the geothermal cooling loop 142 in the apparatus 110 of FIG. 1 is attributable to inclusion of the mechanical cooling apparatus 146 in the cooling system 140B in FIG. 2

(the cooling system 140A in FIG. 1 does not include the mechanical cooling apparatus 146).

The conduits 301 can be connected end-to-end by couplers, polymer welding (melting the ends together), adhesive, or a combination thereof. In aspects, connectors, such as elbow connectors, can be used for direction change of the conduits 301 around the plant 100; alternatively, the conduits 301 may be flexible, and any of the conduits 301 can be bent to form a change in direction for the geothermal cooling loop 142.

The conduits 301 in the geothermal cooling loop 142 can be manufactured from a polymeric material, e.g., polyethylene. The thermal conductivity of polyethylene can range from about 0.3 W/m-K to about 0.5 W/m-K. The thermal conductivity of polyethylene is higher than other polymers (e.g., polyvinylchloride=about 0.1 to 0.25 W/m-k, polypropylene=about 0.1 to 0.2 W/m-k), and the thermal conductivity of polyethylene is lower relative to the thermal conductivity of metals (e.g., copper=about 400 W/m-K, aluminum=250 W/m-K). Using conduits 301 manufactured of polymeric material, e.g., polyethylene, can avoid corrosion that may occur with metal conduits buried underground and in continuous contact with the coolant on the inner surface and with subsurface elements on the outer surface. Moreover, the geothermal cooling loop 142 can be located around the plant 100, which can accommodate for a length of polyethylene conduits 301 (pipe or tube segments) connected end-to-end that is suitable for cooling coolant to the temperature of the earth at the depth of the polyethylene conduits 301.

In aspects, conduit of the geothermal cooling loop 142 can be underground conduit that are buried at a depth under a surface of the earth such that a ground temperature at the depth is always in a range of about 40° F. (4° C.) to about 80° F. (27° C.); alternatively, in a range of about 45° F. (7.2° C.) to about 75° F. (23.9° C.); alternatively, in a range of about 50° F. (10° C.) to about 70° F. (21.1° C.); alternatively, in a range of about 50° F. (10° C.) to about 60° F. (15.6° C.).

An example of a polyethylene conduit is the DRISCOPLEX pipe, which is commercially available from Performance Pipe, a division of Chevron Phillips Chemical Company LP.

Heat Exchange Equipment

The heat exchange equipment 111 disclosed herein can include any equipment in the plant 100 that is configured to contact the coolant with a heat exchange surface in order to remove heat from the heat exchange surface. The heat exchange surface can generally separate the coolant from the heat source, which can be a process stream or a reaction medium in the interior of a reactor.

Figure 4:
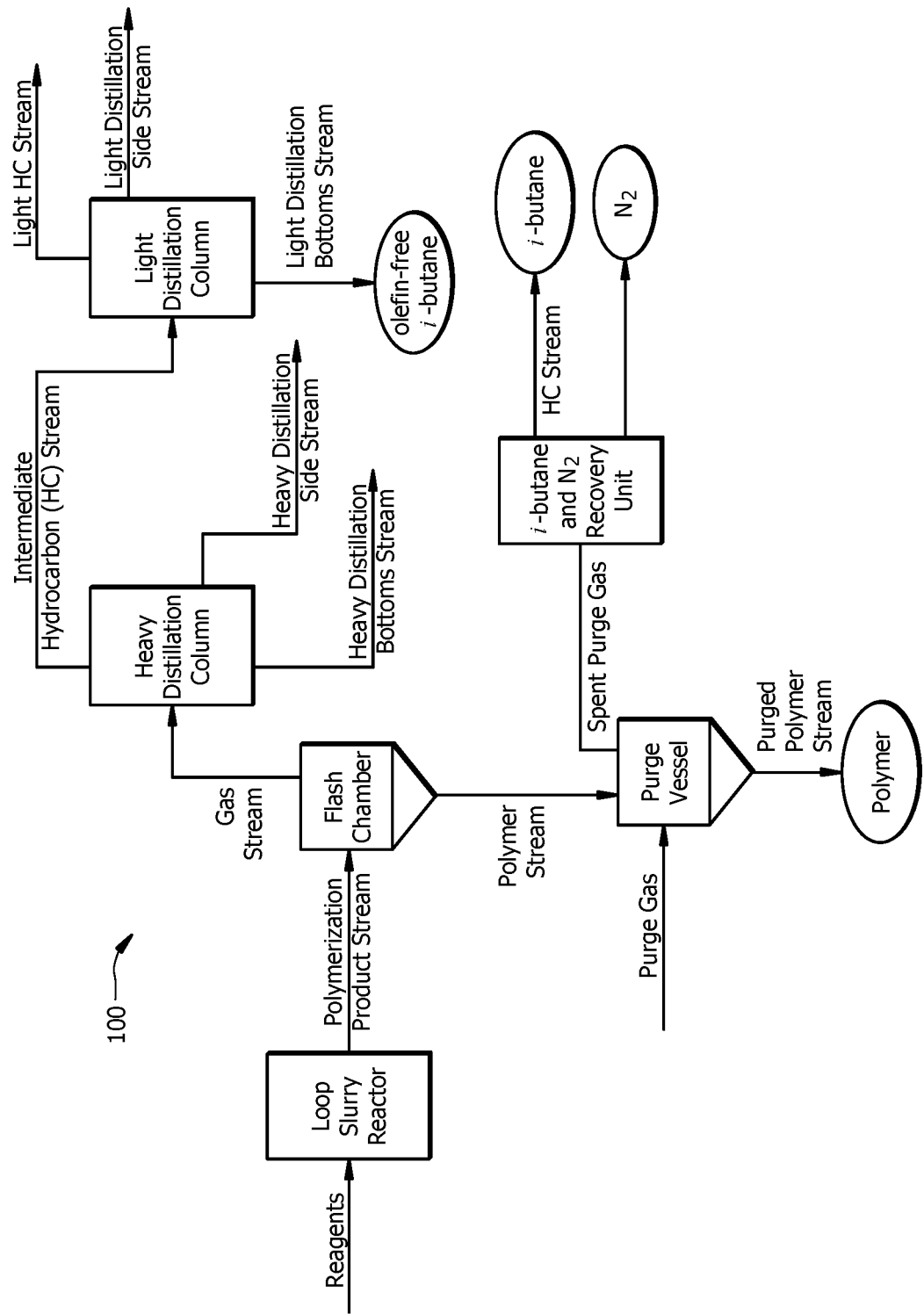
FIG. 4 illustrates a schematic diagram of an embodiment of the plant in FIG. 1 and FIG. 2, which is a polyethylene production plant.

FIG. 4 illustrates a schematic diagram of an embodiment of the plant 100 in FIG. 1 and FIG. 2, which is a polyethylene production plant. The various components in FIG. 4 can be in fluid communication via one or more conduits (e.g., pipes, tubing, flow lines, etc.) suitable for the conveyance of a particular stream. In aspects, the plant 100 of FIG. 4 can have battery limits of about 450 m by 250 m; alternatively, about 400 m by 200 m.

A reagents stream (also referred to as a feed stream) can flow to the loop slurry reactor. Polymerization of reagents (e.g., a monomer and optionally a comonomer) produces a polymer in the form of solid particles. A polymerization product stream containing polymer can flow from the loop slurry reactor to the flash chamber. The flash chamber is configured to separate the polymerization product stream into a gas stream and a polymer stream.

The gas stream can flow from the flash chamber to a monomer/diluent recovery unit containing a heavy distillation column and a light distillation column. The heavy distillation column also can be referred to as a first distillation column or a heavies column. A heavy distillation bottoms stream and a heavy distillation side stream can flow from the heavy distillation column. An intermediate hydrocarbon (HC) stream can flow from the heavy distillation column to the light distillation column. The light distillation column also can be referred to as a second distillation column or a lights column. A light hydrocarbon stream, a light distillation side stream, and a light distillation bottoms stream comprising olefin-free isobutane can flow from the light distillation column. Olefin-free isobutane can be recycled to the loop slurry reactor, for example.

The polymer stream can flow from the flash chamber to the purge vessel. A purge gas stream can flow to the purge vessel. A purged polymer stream comprising the polymer can flow from the purge vessel. A spent purge gas stream can flow from the purge vessel to the isobutane and nitrogen recovery unit (INRU).

Isobutane and nitrogen can be recovered from the INRU. Isobutane recovered from the INRU can be recycled to the heavy distillation column and/or to equipment in the INRU, for example to a compressor of the INRU. Nitrogen recovered from the INRU can be recycled to the purge vessel and/or to equipment in the INRU, for example to a compressor of the INRU.

In aspects of the polyethylene production plant, the heat exchange equipment 111 discussed herein can be associated with the loop slurry reactor of FIG. 4, the INRU of FIG. 4, the heavy distillation column of FIG. 4, or combinations thereof. For example, the heat exchange equipment 111 can be one or more cooling jackets wrapped around an outer surface of a loop slurry reactor. The outer surface of the polymerization reactor can be the heat exchange surface that the coolant contacts when flowing through the cooling jacket(s). In additional or alternative aspects, the heat exchange equipment 111 can include a INRU heat exchanger in an isobutane and nitrogen removal unit (INRU) of the plant 100. The shell-and-tube or plate-and-frame configuration of the INRU heat exchanger can provide the heat exchange surface that the coolant contacts when flowing through the INRU heat exchanger. In additional or alternative aspects, the heat exchange equipment 111 can include a condenser of a heavy distillation column in a monomer/diluent recovery unit. The shell-and-tube or plate-and-frame configuration of the condenser can provide the heat exchange surface that the coolant contacts when flowing through the condenser.

Figure 5:
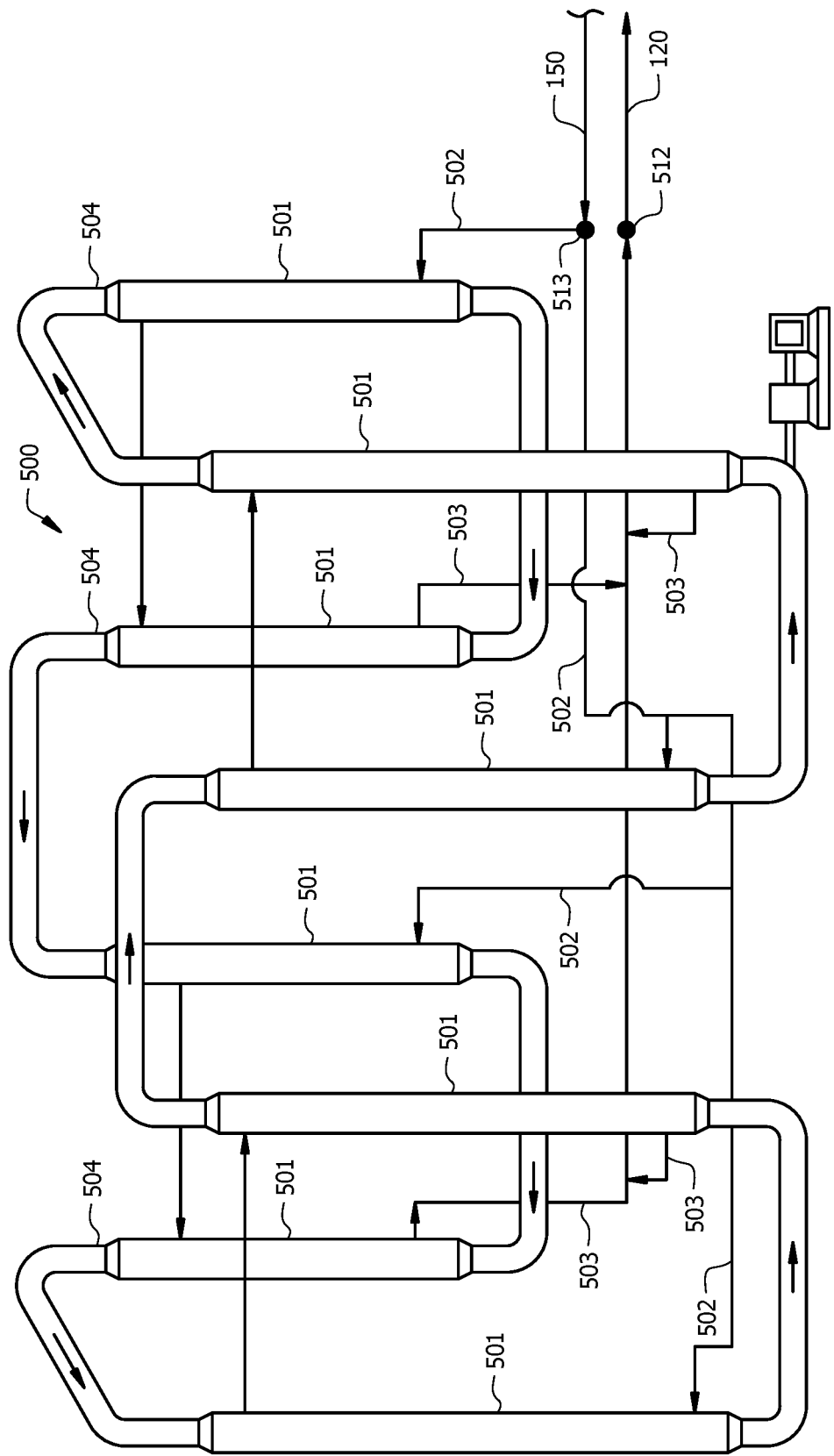
FIG. 5 is a schematic diagram of the loop slurry reactor of FIG. 4 that uses coolant jackets as the heat exchange equipment.

FIG. 5 is a schematic diagram of a loop slurry reactor 500 that uses coolant jackets 501 as the heat exchange equipment. That is, the heat exchange equipment 111 in FIG. 1 can be embodied to include the cooling jackets 501 of a loop slurry reactor 500 of FIG. 5.

Warmed coolant in stream 120 can be received from the coolant outlet 512 of the loop slurry reactor 500. The warmed coolant can flow through the apparatus 110 or 210 as described herein for cooling to produce the combined coolant in stream 150. Combined coolant in stream 150 can be received at the coolant inlet 513 of the loop slurry reactor 500 from the apparatus 110 in FIG. 1 or the apparatus 210 in FIG. 2. The cooling jackets 501 receive cooled coolant via coolant supply lines 502 of the loop slurry reactor 500. The coolant flows through the coolant supply lines 502, through the cooling jackets 501, and into warmed coolant lines 503 of the loop slurry reactor 500. The warmed coolant in lines 503 flows to the coolant outlet 512 of the loop slurry reactor 500, and to the apparatus 110 or 210 (in FIG. 1 or 2) via stream 120.

While FIG. 5 depicts one loop slurry reactor 500, the heat exchange equipment 111 can include cooling jackets for additional loop slurry reactor(s) that is/are similar or substantially identical in configuration as loop slurry reactor 500 with respect to the cooling jackets 501, coolant supply lines 502, and warmed coolant lines 503. In these aspects, the coolant supply lines of the additional reactor(s) can be fluidly connected to the coolant inlet 513, and the warmed coolant lines of the additional reactor(s) can be fluidly connected to the coolant outlet 512.

The loop slurry reactor 500 has eight legs 504; although, more or fewer legs can be utilized in a loop slurry reactor 500. Each leg 504 has a cooling jacket 501 wrapped around an outer surface of the leg 504. Polymerization of one or more olefins (e.g., monomer such as ethylene or propylene, optionally with a comonomer such as butene, hexene, or octene) in an inert diluent (e.g., isobutane or other alkane) occurs inside the loop slurry reactor 500. Polymerization can occur the presence of a polymerization catalyst, such as a Ziegler Natta or metallocene catalyst. As the polymerization reaction proceeds, the reaction conditions may be controlled to facilitate the desired degree of polymerization and reaction speed while keeping the temperature below that at which the polymer product would go into solution. As mentioned, due to the exothermic nature of the polymerization reaction, the cooling jackets 501 are provided (around portions of the legs 504) through which the coolant is circulated as needed to remove excess heat (heat of reaction) from the reactor 500, thereby maintaining the reactor temperature within the desired range, for example, in a range of from about 150° F. to about 250° F. (65° C. to 121° C.).

The cooling system 140A in apparatus 110 (see FIG. 1) and the cooling system 140B in apparatus 210 (see FIG. 2) are configured to provide cooled coolant in stream 150 at a temperature in a range disclosed herein. The valves 161, 162, 163, and 164 of FIGS. 1 and 2 can be controlled as described herein so as to control the temperature of the cooled coolant in stream 150, so as to facilitate maintaining the temperature of the loop slurry reactor 500 within the desired range, for example, a reactor temperature in a range of from about 150° F. to about 250° F. (65° C. to 121° C.).

Figure 6:
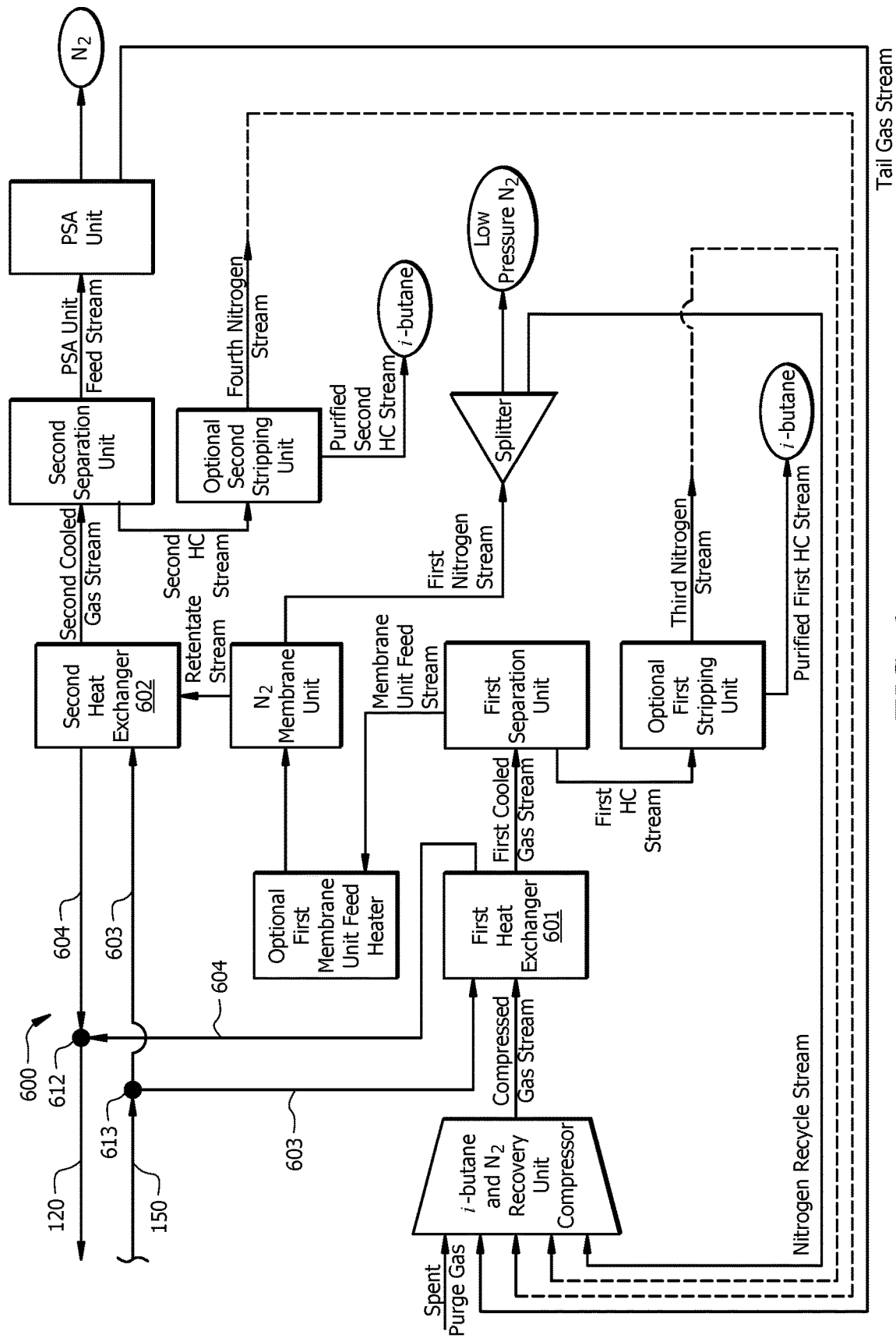
FIG. 6 is a schematic diagram of the INRU of FIG. 4 that uses one or more heat exchangers as the heat exchange equipment.

FIG. 6 is a schematic diagram of the INRU 600 of FIG. 4 that uses one or more heat exchangers 601 and 602 as the heat exchange equipment. That is, the heat exchange equipment 111 in FIG. 1 can be embodied to include the heat exchangers 601 and 602 of FIG. 6.

Warmed coolant in stream 120 can be received from the coolant outlet 612 of the INRU 600. The warmed coolant can flow through the apparatus 110 or 210 as described herein for cooling to produce the combined coolant in stream 150. Combined coolant in stream 150 can be received at the coolant inlet 613 of the INRU 600 from the apparatus 110 in FIG. 1 or the apparatus 210 in FIG. 2. The heat exchangers 601 and 602 receive cooled coolant via coolant supply lines 603. The coolant flows through the coolant supply lines 603, through the heat exchangers 601 and 602, and into warmed coolant lines 604. The warmed coolant in lines 604 flows to the coolant outlet 612 of the INRU 600, and to the apparatus 110 or 210 (in FIG. 1 or 2) via stream 120.

The INRU 600 can include the equipment labeled in FIG. 6, including the heat exchanger 601 and heat exchanger 602. The equipment can be fluidly connected as shown in FIG. 6. The INRU 600 is configured to receive a purge gas containing hydrocarbons and nitrogen from a purge vessel (such as purge vessel in FIG. 4, also known as a degassing vessel), and to separate the components in the purge gas so as to recover a stream of higher purity nitrogen and a stream of higher purity isobutane in FIG. 6.

The heat exchanger 601 can be embodied as any suitable heat exchanger (e.g., shell and tube or plate and frame) that can utilize the coolant disclosed herein to lower the temperature of the compressed gas stream to condense hydrocarbons in the compressed gas stream and to produce warmed coolant. For example, the combined coolant received from stream 150 and coolant supply line 603 can remove heat from the compressed gas stream in the heat exchanger 601 such that the compressed gas stream having a temperature in a range of 100° F. to 350° F. (37.7° C. to 176.7° C.) produces the first cooled gas stream having a temperature in a range of 50° F. to 150° F. (10° C. to 65.6° C.)

The heat exchanger 602 can be embodied as any suitable heat exchanger (e.g., shell and tube or plate and frame) that can utilize the coolant disclosed herein to lower the temperature of the retentate stream to condense hydrocarbons in the retentate stream and to produce warmed coolant. For example, the combined coolant received from stream 150 and coolant supply line 603 can remove heat from the retentate stream in the heat exchanger 602 such that the retentate stream having a temperature in a range of 70° F. to 170° F. (21.1° C. to 76.7° C.) produces the second cooled gas stream having a temperature in a range of −20° F. to 110° F. (−28.8° C. to 43.4° C.).

Figure 7:
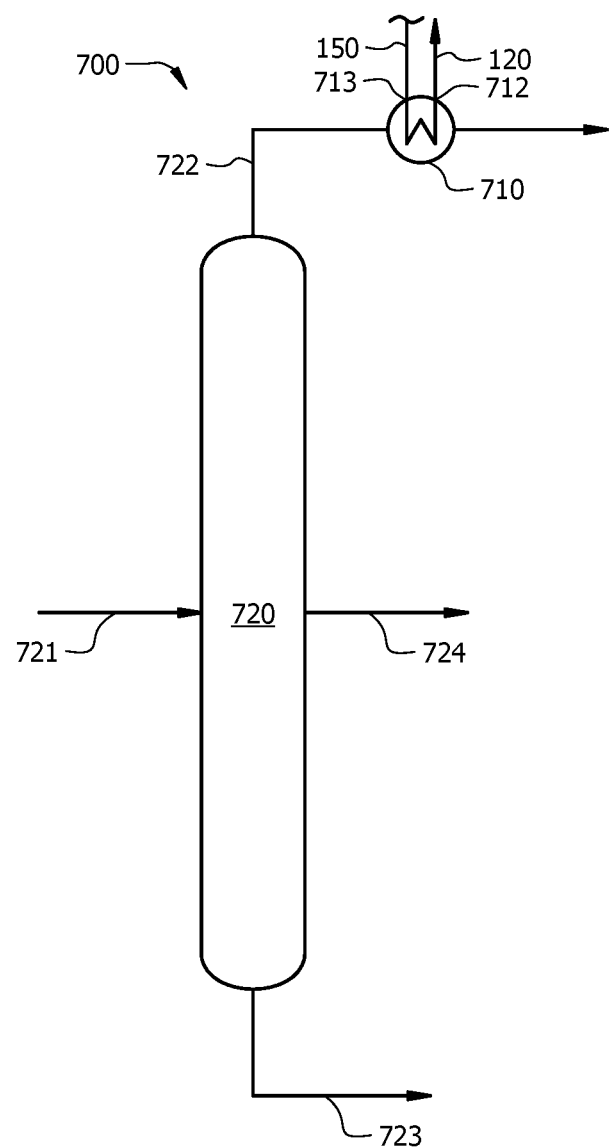
FIG. 7 is a schematic diagram of the heavy distillation column of FIG. 4 that uses a condenser as the heat exchange equipment.

FIG. 7 is a schematic diagram of a heavy distillation column 700, using a condenser 710 on the overhead stream 722 as the heat exchange equipment. That is, the heat exchange equipment 111 in FIG. 1 can be embodied to include the condenser 710 of FIG. 7.

Warmed coolant in stream 120 can be received from the coolant outlet 712 of the condenser 710. The warmed coolant can flow through the apparatus 110 or 210 as described herein for cooling to produce the cooled coolant in stream 150. Cooled coolant in stream 150 can be received at the coolant inlet 713 of the condenser 710 from the apparatus 110 in FIG. 1 or the apparatus 210 in FIG. 2. The coolant flows through the condenser 710, absorbing heat from the overhead stream 722 so as to condense at least a portion of the overhead stream 722 to form the intermediate hydrocarbon (HC) stream in FIG. 4. The warmed coolant flows to the coolant outlet 712 of condenser 710, and to the apparatus 110 or 210 (in FIG. 1 or 2) via stream 120.

In operation of the heavy distillation column 720, the gas stream 721 received from a flash tank can be separated in the heavy distillation column 720 into the overhead stream 722, a bottoms stream 723, and an optional side stream 724. At least a portion of the gas(es) in the overhead stream 722 can be condensed in the condenser 710 to form the intermediate hydrocarbon (HC) stream in FIG. 4. Non-distilled components in the heavy distillation column 720 can flow from the heavy distillation column 720 in bottoms stream 723. A side stream 724 can optionally flow from the heavy distillation column 720.

Overhead stream 722 can include $C_4$ and lighter hydrocarbons (e.g., butane, isobutane, propane, ethane, methane, or combinations thereof) and any light gases (e.g., nitrogen). For example, C4 and lighter hydrocarbons and gases can be present in the overhead stream 722 in an amount of from about 80% to about 100% based on a total weight of the intermediate hydrocarbon stream, alternatively from about 90% to about 99.999999%, alternatively from about 99% to about 99.9999%, alternatively, C5 and heavier hydrocarbons can be present in the overhead stream 722 in an amount from about 0% to about 20% based on a total weight of the intermediate hydrocarbon stream, alternatively from about 10% to about 0.000001%, alternatively from about 1.0% to about 0.0001%.

Bottoms stream 723 can include heavy alkanes having a carbon number that is greater than the carbon numbers of the olefins used for polymerization (e.g., heptane, other large alkanes, or both). Hydrocarbons other than heavy alkanes can be present in the bottoms stream 723 in an amount less than about 15%, alternatively, less than about 10%, alternatively, less than about 5% based on a total weight of the bottoms stream 723.

Side stream 724 can include comonomer, e.g., 1-butene or 1-hexene. For example, comonomer can be present in side stream 724 in an amount of from about 20% to about 98% based on a total weight of the heavy distillation side stream 320, alternatively from about 40% to about 95%, or alternatively from about 50% to about 95%. In aspects where the side stream 724 recovers comonomer, the comonomer can be recycled to a polymerization reactor, e.g., the loop slurry reactor 500 of FIG. 5.

The heavy distillation column 720 can include a reboiler in the bottoms stream 723 configured to reboil at least a portion of the bottom stream 723 to flow as vapor back to the heavy distillation column 720.

The heavy distillation column 720 can be operated at a suitable temperature and pressure, for example as can be suitable to achieve separation of the components of the gas stream in FIG. 4. For example, the heavy distillation column 720 can be operated such that a temperature at the top of the column 720 and a temperature at the bottom of the column 720 are in a range of from about 15° C. to about 233° C. The heavy distillation column 720 can be operated at a pressure in a range of from about 14.7 psig (101.3 kPag) to about 527.9 psig (3.64 MPag). The heavy distillation column 720 can include any number of trays or packing to provide for the separation described herein.

Processes

Processes are described below with reference to components in FIGS. 1 to 7.

A first process performed in the apparatus 110 of FIG. 1 can include a first process for cooling a coolant used in a heat exchange equipment 111 in a plant 100. The first process includes introducing a first warmed coolant in stream 131 having a first temperature to an inlet 141 of a cooling system 140A comprising a geothermal cooling loop 142. The first process can further include cooling the first warmed coolant in the geothermal cooling loop 142 of the cooling system 140A to form a cooled coolant in stream 144 having a second temperature, wherein the second temperature is less than the first temperature. In the first process, the inlet 141 of the cooling system 140A can be fluidly coupled to a coolant outlet 112 of the heat exchange equipment 111 in the plant 100, and an outlet 143 of the cooling system 140A can be fluidly coupled to a coolant inlet 113 of the heat exchange equipment 111 in the plant 100. The first process can further include receiving the first warmed coolant at the inlet 141 of the cooling system 140A via a warmed coolant stream 120 that is connected to the coolant outlet 112 of the heat exchange equipment 111 in the plant 100.

In aspects, the first temperature can be in a range of from about 130° F. (54.4° C.) to about 190° F. (87.8° C.) and the second temperature can be in a range of from about 60° F. (15.5° C.) to about 100° F. (37.8° C.). In further aspects, the second temperature can be in a range of from about 65° F. (18.3° C.) to about 70° F. (21.1° C.).

The first process can additionally include splitting the warmed coolant stream 120 into the first warmed coolant in stream 131, a second warmed coolant in stream 132, and a third warmed coolant in stream 133. The first process can additionally include flowing the second warmed coolant through stream 132 (e.g., a bypass line) and flowing the third warmed coolant through a heater 134 to form a heated coolant in stream 135. The first process can additionally include combining the cooled coolant produced by the cooling system 140A, the second warmed coolant in stream 132, and the heated coolant in stream 135 to form a combined coolant stream 150. The first process can also include flowing the combined coolant stream 150 to the coolant inlet 113 of the heat exchange equipment 111.

The first process can additionally include controlling a flow of the cooled coolant in stream 144, the second warmed coolant in stream 132, the heated coolant in stream 135, or a combination thereof, such that a temperature of the combined coolant stream 150 is in a range of from about 60° F. (15.5° C.) to about 100° F. (37.8° C.).

A process performed in the apparatus 210 of FIG. 2 can include a second process for cooling a coolant used in a heat exchange equipment 111 in a plant 100. The second process includes introducing a first warmed coolant in stream 131 having a first temperature to an inlet 145 of a cooling system 140B comprising a mechanical cooling apparatus 146 and a geothermal cooling loop 142. In aspects, the introducing step includes introducing the first warmed coolant in stream 131 having the first temperature to an inlet 145 of the mechanical cooling apparatus 146. The second process can further include cooling the first warmed coolant in mechanical cooling apparatus 146 to form an intermediate coolant in stream 147 having a third temperature. The second process can further include introducing the intermediate coolant in stream 147 having the third temperature to the inlet 141 of the geothermal cooling loop 142, and cooling the intermediate coolant in the geothermal cooling loop 142 of the cooling system 140B to form the cooled coolant in stream 144 having the second temperature, wherein the second temperature is less than the first temperature. In the second process, the inlet 145 of the cooling system 140B can be fluidly coupled to a coolant outlet 112 of the heat exchange equipment 111 in the plant 100, and an outlet 143 of the cooling system 140B can be fluidly coupled to a coolant inlet 113 of the heat exchange equipment 111 in the plant 100. The second process can further include receiving the first warmed coolant at the inlet 145 of the cooling system 140B via a warmed coolant stream 120 that is connected to the coolant outlet 112 of the heat exchange equipment 111 in the plant 100.

In aspects, the first temperature can be in a range of from about 130° F. (54.4° C.) to about 190° F. (87.8° C.) and the second temperature can be in a range of from about 60° F. (15.5° C.) to about 100° F. (37.8° C.). In further aspects, the second temperature can be in a range of from about 65° F. (18.3° C.) to about 70° F. (21.1° C.). In further aspects, the third temperature is less than the first temperature and greater than the second temperature.

The second process can additionally include splitting the warmed coolant stream 120 into the first warmed coolant in stream 131, a second warmed coolant in stream 132, and a third warmed coolant in stream 133. The second process can additionally include flowing the second warmed coolant through stream 132 (e.g., a bypass line) and flowing the third warmed coolant through a heater 134 to form a heated coolant in stream 135. The second process can additionally include combining the cooled coolant produced by the cooling system 140B, the second warmed coolant in stream 132, and the heated coolant in stream 135 to form a combined coolant stream 150. The second process can also include flowing the combined coolant stream 150 to the coolant inlet 113 of the heat exchange equipment 111.

The second process can additionally include controlling a flow of the cooled coolant in stream 144, the second warmed coolant in stream 132, the heated coolant in stream 135, or a combination thereof, such that a temperature of the combined coolant stream 150 is in a range of from about 60° F. (15.5° C.) to about 100° F. (37.8° C.).

Additional Description

Processes and apparatuses for cooling a coolant used in a heat exchange equipment of a plant have been described. The present application is also directed to the subject-matter described in the following numbered paragraphs (referred to as "para" or "paras"):

Para 1. A process for cooling a coolant used in a heat exchange equipment in a plant, the process comprising: introducing a first warmed coolant having a first temperature to an inlet of a cooling system comprising a geothermal cooling loop; and cooling the first warmed coolant in the cooling system to form a cooled coolant having a second temperature, wherein the second temperature is less than the first temperature, wherein an inlet of the cooling system is fluidly coupled to a coolant outlet of the heat exchange equipment in the plant, wherein an outlet of the cooling system is fluidly coupled to a coolant inlet of the heat exchange equipment in the plant.

Para 2. The process of Para 1, further comprising: receiving the first warmed coolant at the inlet of the cooling system via a warmed coolant stream that is connected to the coolant outlet of the heat exchange equipment in the plant.

Para 3. The process of Para 1 or 2, wherein the first temperature is in a range of from about 130° F. (54.4° C.) to about 190° F. (87.8° C.) and the second temperature is in a range of from about 60° F. (15.5° C.) to about 100° F. (37.8° C.).

Para 4. The process of any of Paras 1 to 3, wherein the second temperature is in a range of from about 65° F. (18.3° C.) to about 70° F. (21.1° C.).

Para 5. The process of any of Paras 1 to 4, wherein the cooling system further comprises a mechanical cooling apparatus having an outlet fluidly connected to an inlet of the geothermal cooling loop, the process further comprising: introducing the first warmed coolant having the first temperature to an inlet of a mechanical cooling apparatus; cooling the first warmed coolant in the mechanical cooling apparatus to form an intermediate coolant having a third temperature; introducing the intermediate coolant having the third temperature to the inlet of the geothermal cooling loop; and cooling the intermediate coolant in the geothermal cooling loop to form the cooled coolant having the second temperature.

Para 6. The process of Para 5, wherein the third temperature is less than the first temperature and greater than the second temperature.

Para 7. The process of Para 5 or 6, wherein the mechanical cooling apparatus comprises an air fin cooler.

Para 8. The process of any of Paras 1 to 7, wherein the heat exchange equipment is configured to cool a loop polymerization reactor, a process stream in an isobutane and nitrogen removal unit (INRU), or an overhead stream of a heavy distillation column.

Para 9. The process of any of Paras 1 to 8, wherein the geothermal cooling loop comprises an underground conduit that is buried at a depth under a surface of the earth such that an ambient temperature at the depth is always in a range of about 40° F. (4° C.) to about 80° F. (27° C.).

Para 10. The process of any of Paras 1 to 9, wherein the geothermal cooling loop comprises at least two conduits placed having a length such that heat transfer through the conduits to the earth produces the cooled coolant having the second temperature.

Para 11. The process of any of Paras 1 to 10, wherein the underground conduit has a nominal pipe size in a range of about 1.25 inches to about 6 inches.

Para 12. The process of any of Paras 9 to 11, wherein the underground conduit comprises one or more segments of polyethylene pipe.

Para 13. The process of any of Paras 9 to 12, wherein at least a portion of the underground conduit is buried along a perimeter of the plant.

Para 14. The process of any of Paras 1 to 13, further comprising: splitting a warmed coolant stream into the first warmed coolant, a second warmed coolant, and a third warmed coolant; flowing the second warmed coolant through a bypass line; flowing the third warmed coolant through a heater to form a heated coolant; combining the cooled coolant, the second warmed coolant, and the heated coolant to form a combined coolant stream; and flowing the combined coolant stream to the coolant inlet of the heat exchange equipment.

Para 15. The process of any of Paras 1 to 14, further comprising: controlling a flow of the cooled coolant, the second warmed coolant, the heated coolant, or a combination thereof, such that a temperature of the combined coolant stream is in a range of from about 60° F. (15.5° C.) to about 100° F. (37.8° C.).

Para 16. A cooling apparatus for coolant used to cool a heat exchange equipment in a plant, comprising: a geothermal cooling loop comprising an underground conduit that is buried within a boundary of the plant at a depth under a surface of the earth such that an ambient temperature at the depth is always in a range of from about 40° F. (4° C.) to about 80° F. (27° C.), wherein the geothermal cooling loop is configured to receive a warmed coolant or an intermediate coolant to form a cooled coolant having temperature in a range of from about 60° F. (15.5° C.) to about 100° F. (37.8° C.), wherein an inlet of the geothermal cooling loop is fluidly coupled to a coolant outlet of the heat exchange equipment in the plant, wherein an outlet of the geothermal cooling loop is fluidly coupled to a coolant inlet of the heat exchange equipment in the plant.

Para 17. The cooling apparatus of Para 16, further comprising: an air fin cooler having an outlet fluidly connected to an inlet of the geothermal cooling loop, wherein an inlet of the air fin cooler is fluidly coupled to the coolant outlet of the heat exchange equipment in the plant, wherein the air fin cooler is configured to receive the warmed coolant and to form the intermediate coolant, wherein the geothermal cooling loop is configured to receive the intermediate coolant.

Para 18. The cooling apparatus of Para 16 or 17, wherein the underground conduit comprises one or more segments of polyethylene pipe having a nominal pipe size in a range from 1.25 inches to 6 inches.

Para 19. The cooling apparatus of any of Paras 16 to 18, wherein at least a portion of the underground conduit is buried along a perimeter of the plant.

Para 20. The cooling apparatus of any of Paras 16 to 19, wherein the heat exchange equipment is configured to cool a loop polymerization reactor, a process stream in an isobutane and nitrogen removal unit (INRU), or an overhead stream of a heavy distillation column.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, processes and steps described in the specification. As one of ordinary skill in the art will readily appreciate from the disclosure, processes, machines, manufacture, compositions of matter, means, processes, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, processes, or steps.

What is claimed is:

1. A process for cooling a coolant used in a heat exchange equipment in a polyethylene production plant, the process comprising:
   introducing a first portion of a first warmed coolant having a first temperature to an inlet of a cooling system comprising a geothermal cooling loop, wherein the geothermal cooling loop comprises a series of underground conduits that is buried within a boundary of the polyethylene production plant at a depth such that an ambient temperature at the depth is always in a range of about 40° F. (4° C.) to about 80° F. (27° C.);
   introducing a second portion of the first warmed coolant to a tower water system;
   cooling the first portion of the first warmed coolant in the cooling system to form a cooled coolant having a second temperature, wherein the second temperature is less than the first temperature; and
   cooling the second portion of the first warmed coolant in the tower water system to form a second cooled coolant,
   wherein an inlet of the cooling system is fluidly coupled to a coolant outlet of the heat exchange equipment in the polyethylene production plant,
   wherein an outlet of the cooling system is fluidly coupled to a coolant inlet of the heat exchange equipment in the polyethylene production plant.

2. The process of claim 1, further comprising:
   receiving the first portion of the first warmed coolant at the inlet of the cooling system via a warmed coolant stream that is connected to the coolant outlet of the heat exchange equipment in the polyethylene production plant.

3. The process of claim 2, wherein the first temperature is in a range of from about 130° F. (54.4° C.) to about 190° F. (87.8° C.) and the second temperature is in a range of from about 60° F. (15.5° C.) to about 100° F. (37.8° C.), wherein the second temperature is in a range of from about 65° F. (18.3° C.) to about 70° F. (21.1° C.).

4. The process of claim 1, wherein the cooling system further comprises a mechanical cooling apparatus having an outlet fluidly connected to an inlet of the geothermal cooling loop, the process further comprising:
   introducing the first portion of the first warmed coolant having the first temperature to an inlet of the mechanical cooling apparatus;
   cooling the first portion of the first warmed coolant in the mechanical cooling apparatus to form an intermediate coolant having a third temperature;
   introducing the intermediate coolant having the third temperature to the inlet of the geothermal cooling loop; and
   cooling the intermediate coolant in the geothermal cooling loop to form the first cooled coolant having the second temperature.

5. The process of claim 4, wherein the third temperature is less than the first temperature and greater than the second temperature.

6. The process of claim 4, wherein the mechanical cooling apparatus comprises an air fin cooler.

7. The process of claim 1, wherein the heat exchange equipment is configured to cool i) a process stream in an isobutane and nitrogen removal unit (INRU) or an overhead stream of a heavy distillation column, and ii) a loop polymerization reactor.

8. The process of claim 1, wherein the series of underground conduits has a length such that heat transfer through the series of underground conduits to the earth produces the first cooled coolant having the second temperature.

9. The process of claim 1, wherein the series of underground conduits has a nominal pipe size in a range of 1.25 inches to 6 inches, wherein the series of underground conduits comprises polyethylene pipe.

10. The process of claim 1, wherein at least a portion of the series of underground conduits is buried along a perimeter of the polyethylene production plant.

11. The process of claim 1, wherein the series of underground conduits has a spiral arrangement, wherein the spiral arrangement has a first section of conduits and a second section of conduits, wherein the first section of conduits has i) a horizontal separation, ii) a vertical separation, or iii) both a horizontal separation and a vertical separation from the second section of conduits.

12. The process of claim 1, wherein the depth is in a range of from about 8 ft (2.4 m) to about 40 ft (12.2 m) under a surface of the earth.

13. A cooling apparatus for coolant used to cool a heat exchange equipment in a polyethylene production plant, comprising:
   a geothermal cooling loop comprising a series of underground conduits that is buried within a boundary of the polyethylene production plant at a depth such that an ambient temperature at the depth is always in a range of from about 40° F. (4° C.) to about 80° F. (27° C.), wherein the geothermal cooling loop is configured to receive a first portion of a warmed coolant or an intermediate coolant to form a first cooled coolant having temperature in a range of from about 60° F. (15.5° C.) to about 100° F. (37.8° C.); and
   a tower water system configured to receive a second portion of the warmed coolant to form a second cooled coolant,
   wherein an inlet of the geothermal cooling loop is fluidly coupled to a coolant outlet of the heat exchange equipment in the polyethylene production plant, wherein an outlet of the geothermal cooling loop is fluidly coupled to a coolant inlet of the heat exchange equipment in the polyethylene production plant.

14. The cooling apparatus of claim 13, wherein the depth is in a range of from about 8 ft (2.4 m) to about 40 ft (12.2 m) under a surface of the earth.

15. The cooling apparatus of claim 13, further comprising:
an air fin cooler having an outlet fluidly connected to an inlet of the geothermal cooling loop, wherein an inlet of the air fin cooler is fluidly coupled to the coolant outlet of the heat exchange equipment in the polyethylene production plant, wherein the air fin cooler is configured to receive the warmed coolant and to form the intermediate coolant, wherein the geothermal cooling loop is configured to receive the intermediate coolant.

16. The cooling apparatus of claim 13, wherein the series of underground conduits comprises polyethylene pipe having a nominal pipe size in a range of 1.25 inches to 6 inches.

17. The cooling apparatus of claim 13, wherein at least a portion of the series of underground conduits is buried along a perimeter of the polyethylene production plant.

18. The cooling apparatus of claim 13, wherein the heat exchange equipment is configured to cool i) a process stream in an isobutane and nitrogen removal unit (INRU) or an overhead stream of a heavy distillation column, and ii) optionally a loop polymerization reactor.

* * * * *